Feb. 17. 1925.

W. J. SMITH

RAILWAY BRAKE

Original Filed May 8, 1920

1,526,764

INVENTOR
William J. Smith
BY
Drull, Warfield & Drull
ATTORNEY

Patented Feb. 17, 1925.

1,526,764

UNITED STATES PATENT OFFICE.

WILLIAM JUDSON SMITH, OF ST. PAUL, MINNESOTA.

RAILWAY BRAKE.

Original application filed May 8, 1920, Serial No. 379,730. Divided and this application filed August 6, 1921. Serial No. 490,198.

*To all whom it may concern:*

Be it known that I, WILLIAM JUDSON SMITH, a citizen of the United States, residing at St. Paul, in the county of Ramsey and State of Minnesota, have invented certain new and useful Improvements in Railway Brakes, of which the following is a full, clear, and exact description, such as will enable others skilled in the art to which it appertains to make and use the same.

This invention relates to braking means for trucks and is a division of the prior application of W. J. Smith for truck, filed May 8, 1920, Serial No. 379,730, which has become Patent No. 1,405,168, dated January 31, 1922.

It is an object of the invention to provide an improved braking mechanism which avoids wear on the truck wheels and avoids failures in the latter which often occur due to improper functioning of the brake shoes.

It is a further object of the invention to provide an improved braking mechanism mechanism which is relatively light in weight, efficient in operation and quick in automatic release.

Another object is to provide an improved braking mechanism of the drum and band type having an especially large friction contact area and wherein the wear on the parts is evenly distributed.

It is another object of the invention to provide an improved braking mechanism especially adapted for use with street railway car and other railway trucks possessing features of structural superiority and functional advantage.

Other objects will be in part obvious and in part pointed out hereinafter.

Figure 1:
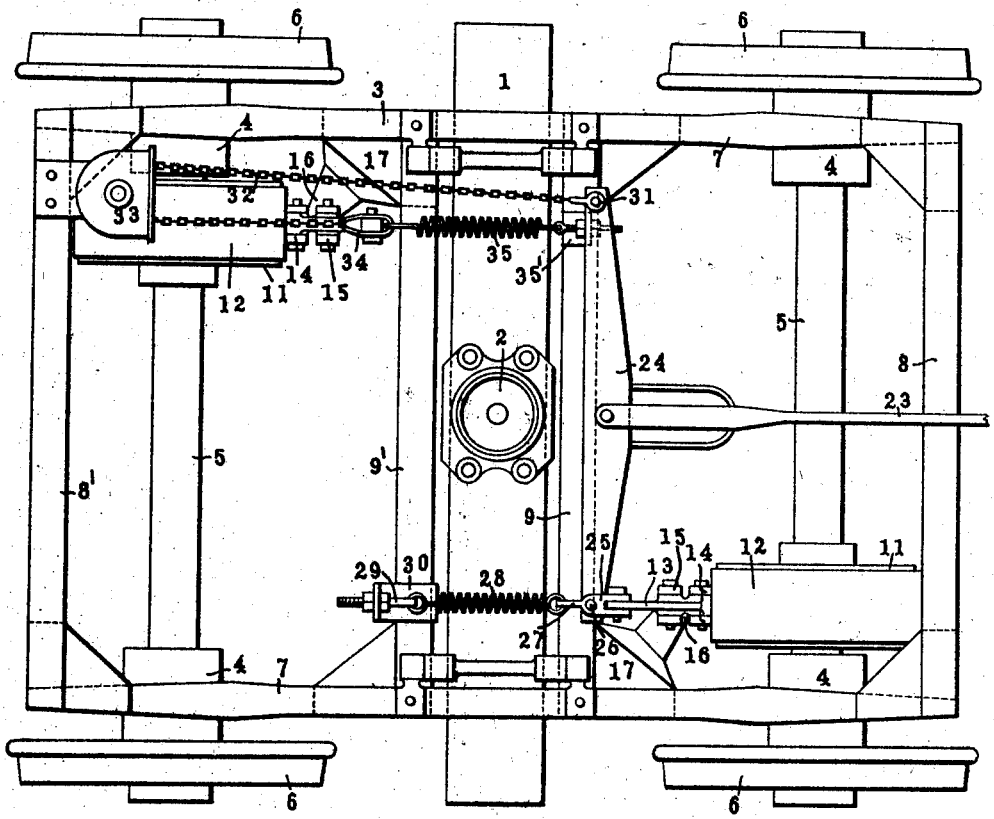
Figure 2:
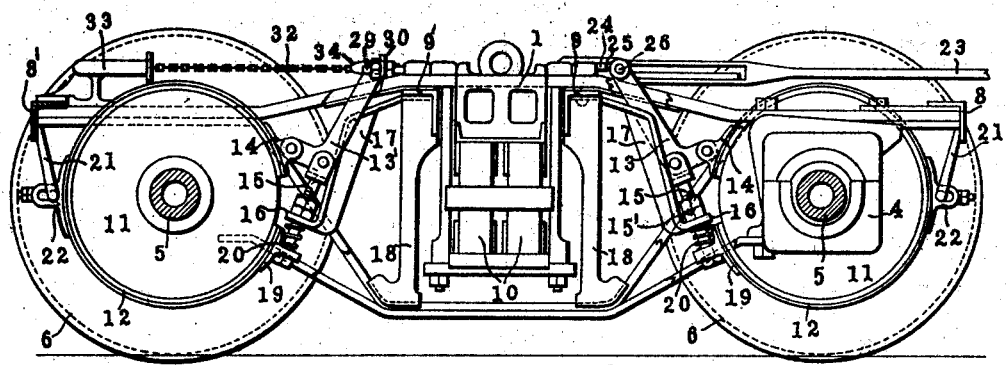

In the accompanying drawings which illustrate a preferred embodiment of the invention, Figure 1 is a plan view of a truck provided with the improved braking means; and Fig. 2 is a side view of the same, the wheels and obstructing frame parts being broken away for clearness.

The general construction of the truck shown in the drawings comprises a truck bolster 1 having a center bearing 2, a truck frame 3, journal boxes 4, axles 5, and wheels 6. The truck frame includes side frame members 7 joined by transverse end pieces 8 8' and by transom members 9, 9'. In the truck shown, load stresses are transmitted from the bolster 1 to the side frames 7 through double elliptic springs 10 by means of suitable connections, and from the frames to the axles through the journal boxes 4. The general truck construction is fully described in said prior application and a more detailed description thereof herein is considered unnecessary.

The present invention concerns an improved braking mechanism for car trucks in which brake bands are applied to brake drums carried by the axles. In the embodiment of the invention shown in the drawing, a single brake-drum 11 having a relatively large braking surface on its periphery is rigidly mounted on each axle 5 so as to rotate therewith. This drum is supplied with a friction brake band 12 which is arranged to engage with the periphery of the drum throughout nearly 360° thereof.

Improved means for applying and releasing said brake band is also provided. As shown in the drawings, the brake band operating means comprises bell-crank levers 13 and 13', the short arm of each of which is pivoted to a bracket 14 mounted on the upper end of the brake band, the other or long arm being connected to the brake actuating mechanism. Pivotally connected at one end to the elbow of the bell-crank lever is a link 15 slidably supported in an opening in the angularly disposed flange 16 of a bracket or casting 17, the latter being suitably mounted in position adjacent the truck column 18 upon one of the transoms 9 and truck sides frame 7. The other end of the link 15 extends through an opening in a bracket or casting 19 secured to the other end of the brake band 12, and is held in cooperative relationship with said bracket by a nut threaded on the end of said link. A spiral spring 20 surrounds the lower end of said link 15, at one end abutting the bracket 19 and at the other end abutting the angularly disposed flange 16 whereby the brake band is yieldingly held in released position. Adjustable nuts 15' are threaded on the link 15 cooperating with the flange 16 to limit the releasing movement of the brake band. It will be noted that this construction allows the brake band to extend nearly around the brake drum, providing a maximum of braking effort for a minimum of weight and size of the parts of the braking mechanism.

Each brake band is supported at a point opposite the connection thereof to its tightening means by a depending link 21 secured by a set screw in an elongated slot formed in a bracket 22 which is riveted or otherwise suitably secured to the brake band. This link 21 is suitably secured at its upper end to a depending flange of the cross piece or sill 8, 8'.

Each bell-crank lever 13 is operated by suitable means to apply the brake, and as shown in the present embodiment, this means comprises a brake rod 23 extending forwardly to a suitable hand or power braking mechanism. This braking mechanism may be of any standard construction, forms no part of the present invention, and need not be further described. The other end of the brake rod is pivotally secured to an equalizing bar 24 intermediate the ends thereof, preferably at its center of length. At one end this bar is fitted with a clevis 25 which is pivotally connected thereto and bifurcated at one end to receive the upper end of the long arm of the bell-crank lever 13, to which it is pivotally connected as at 26. The opposite end of the clevis 25 is supplied with a lug 27 having an aperture therein to receive the end of a coiled tension spring 28, the opposite end of which is adjustably secured by a threaded eye bolt 29 to a bracket 30 mounted on the transom 9'.

The other end of the equalizing bar 24 is also fitted with a clevis 31 pivotally connected thereto, and a flexible member such as a chain 32, is attached at one end to said clevis and extends approximately in a horizontal direction around a horizontally disposed sheave mounted in a bracket 33 on the end piece 8', the end of the backwardly extending portion being connected to a clevis 34 at the upper end of the long arm of the bell-crank lever 13'. Also connected at one end to the clevis 34 is a second coiled tension spring 35, the opposite end of which is connected by suitable adjustable means to a bracket 35' secured on the transom 9. This adjustable means may conveniently comprise a threaded eye bolt passing through said bracket and having nuts to hold and lock the same in adjusted position.

The operation of the braking mechanism which will be obvious from the above description may be briefly described as follows:

When a brake is to be applied, a pulling stress is applied to the brake rod 23 and this stress is transmitted to the bell-crank levers 13, 13' through the equalizing bar 24 and the connections therefrom as described above, the stress from the equalizing bar to the lever 13' being reversed by means of the chain and sheave connection. Thus the bell-crank levers will be moved against the resistance of compression springs 20 to pull the adjacent ends of the brake band together to the drum and apply the brake. When the braking force is removed from the brake rod 23 the braking elements are urged to off position by means of the releasing springs 28 and 35, and this action is also assisted by the expansion of band releasing springs 20.

It will be understood that any desirable number of brake drums might be employed in association with each axle. It is found in practice, however, that a single brake drum of comparatively large dimensions is preferable as it provides a lighter, more compact and more economical braking mechanism.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent, is:—

1. In a truck, in combination, an axle and a braking drum thereon, friction means and means for applying the same to retard said drum, said last mentioned means including a bar and a brake rod connected intermediate the ends thereof, a bell-crank lever, means for connecting one end of said bar to one arm of said bell-crank lever, and resilient means connected to said bar for releasing said friction means.

2. In a braking means for trucks, in combination, truck axles, braking drums on said axles and brake bands therefor, an equalizing bar, a brake rod pivotally connected intermediate the ends thereof, connecting means between one end of said equalizing bar and the ends of one of said brake bands, connecting means between the other end of said equalizing bar and the ends of the other of said brake bands including a flexible member and a sheave therefor, and resilient means for releasing said brake bands.

3. In a railway truck, the combination with a truck frame having side trusses, transverse axles each extending at opposite sides of the truck frame beyond the said trusses and carrying flanged wheels disposed outside of said trusses, of brake drums on said axles disposed inside of said truss frames, a brake band for each of said brake drums, an equalizing bar, a lever connected to one end of each of said brake bands and to each end of said equalizing bar, a link connected to each of said levers and to the opposite end of the corresponding brake band, and brackets carried by said truck frame and adjustably supporting said links.

4. In a railway truck, the combination with a truck frame having side trusses, transverse axles each extending at opposite sides of the truck frame beyond the said trusses and carrying flanged wheels disposed outside of said trusses, of brake drums on said axles disposed inside of said truss frames, a brake band for each of said brake drums, an equalizing bar connected at one end to one of said brake bands, a sheave, a flexible connection extending around said sheave and being connected with the opposite end of said equalizing bar and with another of said brake bands.

5. In a railway truck, the combination with a truck frame having side trusses, transverse axles each journaled in and extending at opposite sides of the truck frame and carrying flanged wheels, brake drums on said axles, an equalizing bar, friction means adapted substantially to encircle said brake drums, actuating levers operatively connected to draw said friction means into engagement with said brake drums, said levers having actuating connections leading to said equalizing bar, and brackets carried by said truck frame and adapted to support said levers and friction means in operative relation to said brake drums.

In testimony whereof I affix my signature, in the presence of two witnesses.

WILLIAM JUDSON SMITH.

Witnesses:
E. N. Leaf,
C. S. Thomson.